Aug. 22, 1933.     L. EDELMANN     1,923,192
SYRINGE THERMOHYDROMETER
Filed May 27, 1930

INVENTOR.
Leo Edelmann
BY Lloyd W. Patch
ATTORNEY.

Patented Aug. 22, 1933

1,923,192

UNITED STATES PATENT OFFICE 1,923,192

SYRINGE THERMOHYDROMETER

Leo Edelmann, Chicago, Ill., assignor to E. Edelmann & Co., Chicago, Ill., a Corporation of Illinois Application May 27, 1930. Serial No. 456,269

5 Claims. (Cl. 265—46)

My invention relates to improvements in syringe thermo-hydrometers and particularly to a device of this character intended and adapted to be used in testing radiator anti-freeze solutions and the like.

An object of this invention is to provide a testing instrument of the syringe type which is so constructed that a float gauge, a thermometer, and related correction tables can be clearly and substantially simultaneously viewed to permit the user to obtain the readings and then readily make reference to the correction tables for any reckonings which may be necessary.

Another object is to so construct the parts that the thermometer will give a temperature reading taken from a sufficiently large quantity of the liquid being tested so that a substantially accurate temperature indication will be given to correspond with the volume of liquid in which the gauge element is floating.

Another object resides in providing a thermo-hydrometer of this type with which the gauge element and thermometer are clearly visible without the necessity of viewing the same through the liquid, and which at the same time provides for enclosure and sealing of the parts in such a manner that they will not be readily affected by outside temperatures.

Still another object resides in providing a syringe type of thermo-hydrometer which is of simple and inexpensive construction and assembly and which will prove highly effective, efficient and accurate in use.

With the above and other objects in view, which will be apparent to those skilled in the art, my present invention includes certain novel features of construction and combinations of parts which will be hereinafter set forth in connection with the drawing and then particularly pointed out in the claims.

Figure 1:
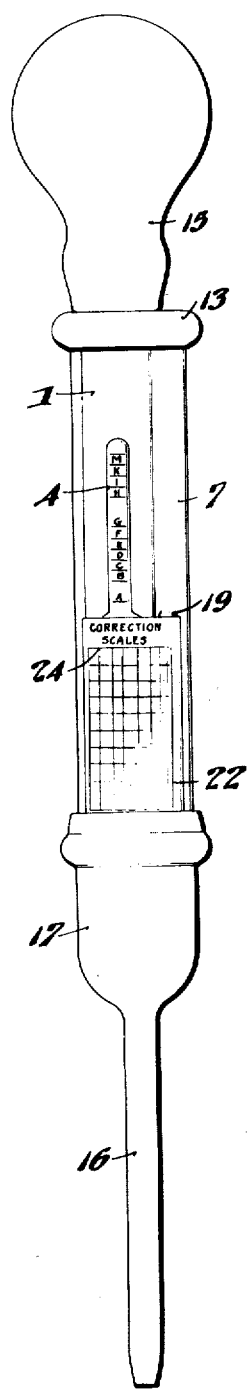
Figure 1 is a view in side elevation of an instrument constructed in accordance with my present invention.
Figure 2:
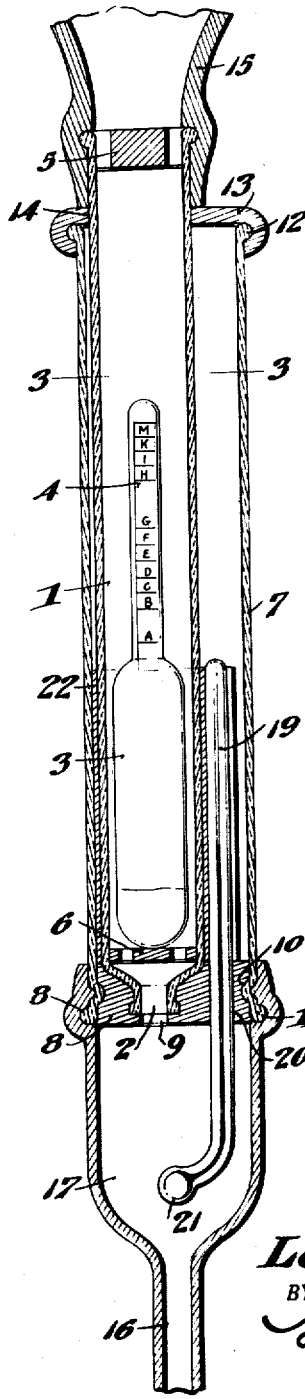
Fig. 2 is an enlarged longitudinal sectional view to better show the construction and assembly of the parts.
Figure 3:
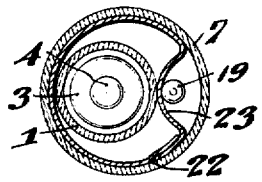
Fig. 3 is a transverse sectional view substantially on line 3—3 of Fig. 2.

The float barrel 1 is of substantially standard form and construction, being of glass or other suitable transparent material, and preferably having the inlet end 2 slightly restricted. The float gauge element 3 is of standard form and the gauge scale and stem thereof will be marked off with standard gauge indications. Plugs 5 and 6, of rubber or other suitable material, and having openings or notches therethrough, are preferably fitted within the upper and lower ends of the float barrel 1 so that the gauge element 3 will be confined therein and cushioned against endwise shocks and contacts.

A housing or casing 7, of glass or other suitable transparent material, is made to have a larger internal diameter and to be preferably slightly shorter than the float barrel 1, and this housing 7 is adapted to be fitted eccentrically around the body of the float barrel 1. A plug 8, of rubber or other suitable material is provided with an opening 9 to receive the inlet end 2 of the float barrel 1 and this plug is of an external diameter to fit snugly within the housing 7 with a liquid-tight fit, the housing 7 being preferably provided with a bead 10 to further insure a liquid-tight joint.

The housing 7 is preferably provided with the bead 11 and 12 around its lower and upper ends, and a cap 13 fitted around the upper end is provided with an eccentric opening 14 to receive the upper end of the float barrel 1 so that this float barrel will be eccentrically mounted and held within the housing 7 and extending substantially parallel with the axis thereof. With the housing 7 slightly shorter than the barrel 1, the upper end of the barrel projects beyond the cap 13 a distance sufficient to receive the syringe bulb 15.

A nozzle tip 16 has a considerably enlarged liquid chamber 17 therein, and a sleeve 18 is provided to fit over the beaded end 11 of the housing 7 so that the nozzle tip will be held with a liquid-tight fit. With this construction and assembly, as the compressed syringe bulb 15 is released, with the nozzle tip 16 in the liquid to be tested, a quantity of liquid will be drawn into the chamber 17 and a part of the liquid will rise into the barrel 1, the bulb 15 being so proportioned that the proper level of liquid in the barrel will be attained to float the gauge element for full and proper readings. This operation gives a considerable quantity of liquid in the chamber 17 insulated from the atmosphere by the material of the nozzle tip and the liquid within the float barrel 1 will be insulated from the atmosphere by reason of the fact that a dead air space is maintained within the housing 7. This will practically insure that the liquid within the barrel 1 and the chamber 17 will be of the same temperature, and consequently a temperature reading to indicate the temperature of the liquid within the chamber 17 will be substantially accurate as indicating the temperature of the liquid in which the gauge element is floated.

The eccentric mounting of the float barrel 1 within the housing 7 leaves a space at one side sufficient to receive the stem 19 of a thermometer, this stem being passed through an opening 20 in the plug 8 so that the bulb end 21 of the thermometer is positioned within the chamber 17. The large size of the chamber 17 also permits a considerable portion of the lower end of the thermometer stem, as well as the bulb, to be exposed to the liquid being tested, and it is consequently possible to obtain quicker and more accurate temperature indications.

The thermometer stem has a liquid-tight fit thorugh the opening 20, and in consequence, the seal is accomplished to maintain the dead air space within the housing 7 around both the barrel 1 and the indicating portion of the thermometer stem 19.

As the lower or float portion of the gauge element 3 extends for a considerable distance up from the lower end of the barrel 1, the gauge stem 4 is in the middle portion of the barrel, and I have found that a scale sheet 22, for paper or other suitable material can be fitted within the lower end of the housing 7 around the lower end of the float barrel 1 and adjacent the stem 19 of the thermometer, without obscuring in any way the stem 4 of the float gauge. This scale sheet can be threaded in to have a portion back of the thermometer stem and the thermometer scale can be printed upon this portion 23 so that it will be back of the thermometer and in the field of vision as the liquid column of the thermometer is viewed. The scale sheet 22 can also have correction tables or other information printed thereon as indicated at 24, and such scales and information will be clearly visible though the housing 7.

Figure 4:
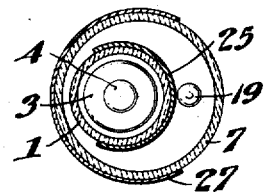
Fig. 4 is a view similar to Fig. 3 showing a modified construction.
Figure 5:
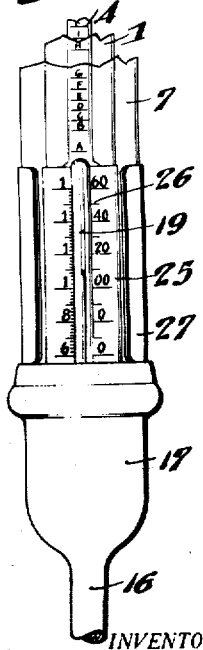
Fig. 5 is a fragmentary view in elevation to better show the modified structure.

With the modified construction shown in Figs. 4 and 5, a split annular sleeve 25 is fitted around the float barrel 1 and has a thermometer scale marked thereon as indicated at 26 to be back of the thermometer indicating stem 19. Also, I have applied a split partial cylindrical scale member 27 around the lower portion of the housing 7 with the split opening thereof sufficiently wide and so spaced that the thermometer structure can be viewed therethrough. This scale member 27 can have correction tables, directions, or any other matter printed or otherwise displayed thereon, and in some instances it may be found desirable to make the portions 25 and 27 of transparent celluloid or other material, with the indications printed in opaque manner thereon so that the matter can be read and at the same time the clear view through the instrument will not be in any way obstructed.

From the foregoing it will be seen that I have provided a thermo-hydrometer of the syringe type which is so constructed that it can be used in substantially the same manner as an ordinary simple hydrometer, and which will give accurate and clearly visible readings of the temperature and the specific gravity or other markings on the float gauge stem, and which will at the same time permit display of correction tables, directions, or other related matter.

While I have herein shown and described only certain specific embodiments of this invention and have suggested only certain posible modifications, it will be apparent that many changes can be made in the form, construction, arrangement, and assembly of the parts, and in the materials to be used, without departing from the spirit and scope of my invention.

I claim:

1. A thermo-hydrometer comprising a transparent housing having closures at its ends, a float barrel mounted within the housing and opening through both of said closures, a thermometer mounted through an opening in one of the closures with its stem within the housing and its stem within the housing and its bulb end extending beyond the end of the housing, suction means connected with the float barrel at the opposite end of the housing, a float within the barrel, and a nozzle tip mounted on the end of the housing and provided with a liquid chamber into which the bulb of the thermometer extends.

2. A thermo-hydrometer comprising a tubular transparent housing, closures to seal the ends of said housing and provided with openings therethrough, a float barrel of greater length than said housing mounted therein and received through alined openings of the closures, with one end extending therefrom, suction means fitted at the extending end of the barrel, a thermometer fitted through an opening in the closure at the opposite end of the housing with its stem within the housing and its bulb extending therefrom, and a nozzle tip fitted at the last-mentioned end of the housing and providing a liquid chamber in which the bulb of the thermometer is received, said liquid chamber being in connection with the adjacent end of the float barrel.

3. A thermo-hydrometer comprising a tubular transparent housing, closures to seal the ends of said housing and provided with openings therethrough, a float barrel of greater length than said housing mounted therein and received through alined openings of the closures, with one end extending therefrom, suction means fitted at the extending end of the barrel, a thermometer fitted through an opening in the closure at the opposite end of the housing with its stem within the housing and its bulb extending therefrom, a nozzle tip fitted at the last-mentioned end of the housing and providing a liquid chamber in which the bulb of the thermometer is received, said liquid chamber being in connection with the adjacent end of the float barrel, a float gauge in said barrel, and a scale sheet fitted within said housing around said barrel in a relation to leave a clear view of the float gauge stem and having temperature scale markings adjacent the thermometer.

4. A thermo-hydrometer comprising, a liquid barrel, a gauge float in said barrel, a nozzle tip at one end of the barrel provided with an enlarged liquid chamber, suction means at the other end of the barrel, a thermometer having a temperature influenced portion within the chamber and having an indicating portion outside thereof and sealed from liquid contact, and a protective housing enclosing the barrel and the indicating portion of the thermometer, said housing being closed at its upper and lower ends against ingress of air and liquid.

5. A thermo-hydrometer comprising, an elongated liquid barrel, a gauge float in said barrel, a nozzle tip at one end of the barrel, suction means at the other end of the barrel, a thermometer having a portion extended into the nozzle to be influenced by liquid taken into the barrel, said thermometer having an indicating portion outside of and sealed from liquid contact, a protective housing of transparent material enclosing the barrel and the indicating portion of the thermometer closed against ingress of liquid, and a scale sheet fitted within said housing around said barrel to thus be out of contact with the liquid and having a portion adjacent to the indicating stem of the thermometer showing markings to be read thereagainst.

LEO EDELMANN.

CERTIFICATE OF CORRECTION.

Patent No. 1,923,192. August 22, 1933.

LEO EDELMANN.

It is hereby certified that error appears in the printed specification of the above numbered patent requiring correction as follows: Page 2, line 91, claim 1, strike out the words and syllable "its stem within the housing and its bulb end ex-"; and that the said Letters Patent should be read with this correction therein that the same may conform to the record of the case in the Patent Office.

Signed and sealed this 1st day of October, A. D. 1940.

(Seal)

Henry Van Arsdale,
Acting Commissioner of Patents.

at the other end of the barrel, a thermometer having a portion extended into the nozzle to be influenced by liquid taken into the barrel, said thermometer having an indicating portion outside of and sealed from liquid contact, a protective housing of transparent material enclosing the barrel and the indicating portion of the thermometer closed against ingress of liquid, and a scale sheet fitted within said housing around said barrel to thus be out of contact with the liquid and having a portion adjacent to the indicating stem of the thermometer showing markings to be read thereagainst.

LEO EDELMANN.

CERTIFICATE OF CORRECTION.

Patent No. 1,923,192. August 22, 1933.

LEO EDELMANN.

It is hereby certified that error appears in the printed specification of the above numbered patent requiring correction as follows: Page 2, line 91, claim 1, strike out the words and syllable "its stem within the housing and its bulb end ex-"; and that the said Letters Patent should be read with this correction therein that the same may conform to the record of the case in the Patent Office.

Signed and sealed this 1st day of October, A. D. 1940.

Henry Van Arsdale, (Seal) Acting Commissioner of Patents.

CERTIFICATE OF CORRECTION.

Patent No. 1,923,192.                                        August 22, 1933.

LEO EDELMANN.

It is hereby certified that error appears in the printed specification of the above numbered patent requiring correction as follows: Page 2, line 91, claim 1, strike out the words and syllable "its stem within the housing and its bulb end ex-"; and that the said Letters Patent should be read with this correction therein that the same may conform to the record of the case in the Patent Office.

Signed and sealed this 1st day of October, A. D. 1940.

Henry Van Arsdale,
(Seal)                                       Acting Commissioner of Patents.